UNITED STATES PATENT OFFICE.

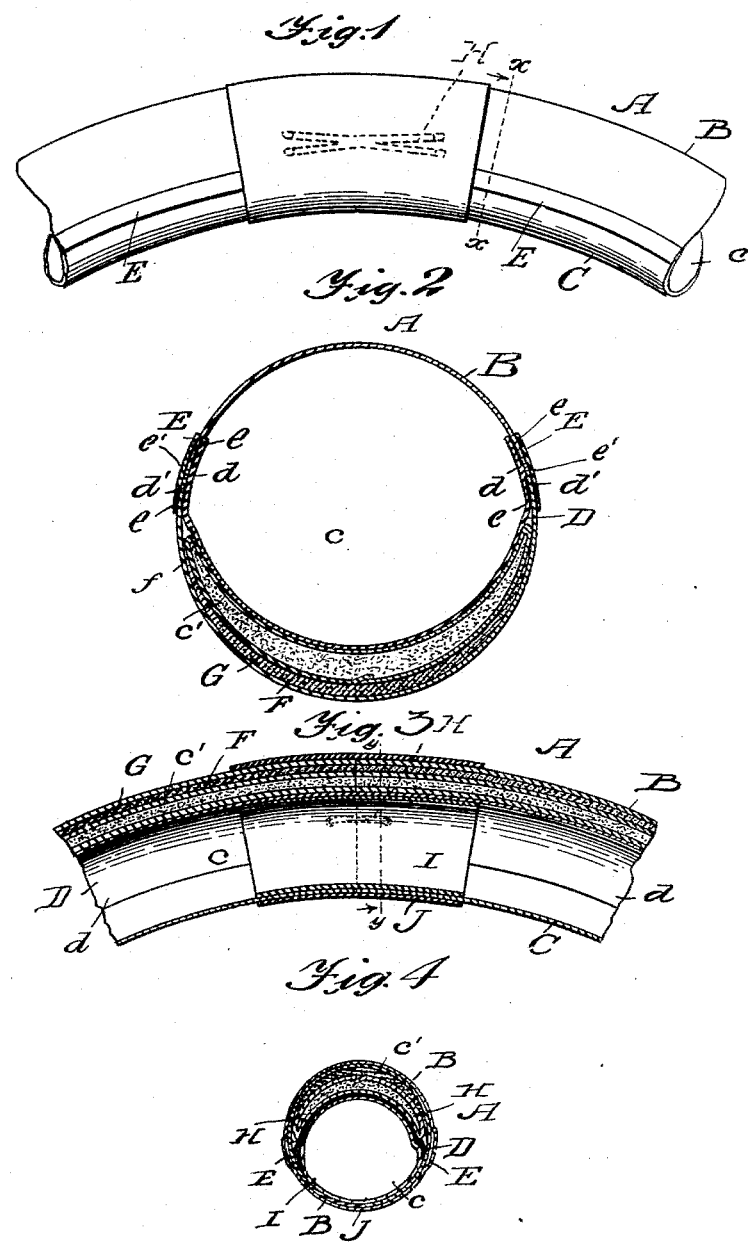

GEORGE WASHINGTON WHITE, OF HUNTSVILLE, ALABAMA.

INFLATABLE TIRE.

SPECIFICATION forming part of Letters Patent No. 589,770, dated September 7, 1897.

Application filed January 8, 1897. Serial No. 618,488. (No model.)

*To all whom it may concern:*

Be it known that I, GEORGE WASHINGTON WHITE, a citizen of the United States, residing at Huntsville, in the county of Madison and State of Alabama, have invented certain new and useful Improvements in Inflatable Tires; and I do hereby declare the following to be a full, clear, and exact description of the invention, such as will enable others skilled in the art to which it appertains to make and use the same.

My invention relates to improvements in inflatable tires for cycle-vehicles as well as on carriages and vehicles generally.

In my improved tire I aim to secure elasticity and ease for the vehicle, the desirable puncture-proof qualities as a protection against rupture of the inner tube confining the inflatable medium, and thoroughly tight air-proof joints between the several elements of the tire.

The improved construction may be used by itself as a tire to be inflated by forcing air or other inflating medium therein, or it may be employed as a sheath or covering for another tire or for the inner tube of other tires, thus making in the latter case the device meet the requirements of a duplex-tube tire.

The first part of my invention consists of a sectional tube divided transversely in a horizontal line and on a plane nearly or about midway between its inner and outer edges and producing an outer tread-section adapted to bear or ride upon the ground and an inner felly-section to be fitted or seated in the rim or felly of any style of wheel. The edges of the tread and felly sections are arranged to abut but preferably do not overlap, and these adjacent edges of said sections are joined in an air-tight manner by expansible yielding or elastic devices, which permit the two sections to be dilated or forced apart under the influence of the inflating medium, such dilation of the tube contributing to the elasticity of the tire and the ease and comfort of the rider, because the tire yields to a greater degree than ordinary inflated tires, which depend for their resiliency upon the inherent elasticity of the rubber or fabric of which they are made. The means adopted for securing air-tight joints between the tread and felly sections of the horizontally-divided tire consists of an inner elastic concavo-convex member and outer elastic members, which are cemented, sealed, or cast to the surfaces of the tread and rim sections on opposite sides of the joint between them, and thus the inner and outer members lap the edges of the sections and lie across the joint, whereby said sealing members effectually prevent the escape or leakage of air, and as they are themselves elastic the sectional tube or tire is free to expand radially under the pressure of the inflating medium, and it is also permitted to yield or give under the weight of the rider and the jar on the wheel. The inner concavo-convex joint-sealing member extends from side to side of the tube and adjacent to the tread-section thereof, and it presents an elastic surface within said tread-section for the air to press against, as well as providing a space, cell, or chamber between said elastic sealing member and the tread-section to accommodate the protective devices provided to shield the inner part of the tire against puncturing.

The second part of my invention relates to the means for protecting the tire against puncture by the penetration of nails, glass, or other sharp substances over which it may travel. The protection or armor consists of a tube, of leather or other material, which is filled with a soft medium—such as moss, hair, &c.—and a tough or stout layer of leather which is fitted directly against the inner surface of the tread-section of the tire.

The invention further consists in the provision of means for uniting the adjacent ends of the tire and for securely closing and sealing said ends against the leakage of air, and it finally consists in the novel combination and construction of parts, as will be hereinafter fully described and claimed.

To enable others to understand my invention, I have illustrated the preferred embodiment of the same in the accompanying drawings, forming a part of this specification, and in which—

Figure 1 is an elevation of a part of my expansible inflatable tire having air-tight joints. Fig. 2 is a cross-sectional view on the plane indicated by the dotted line $x\,x$ of Fig. 1, drawn to an enlarged scale. Fig. 3 is a view showing the means for uniting the meeting ends of the tube which forms the tire. Fig. 4 is a sectional view on the line $y\ y$ of Fig. 3.

Like letters of reference denote corresponding parts in all the figures of the drawings, referring to which—

A designates the tire or the outer cover or jacket of a double-tube tire. The tire A is divided horizontally on a plane about midway between the lines of the inner and outer edges thereof to produce two sections B C, of which the inner section B is adapted to be seated to the rim or felly of a wheel, and for this reason will be hereinafter termed the "rim" or "felly" section, while the other section C is adapted to travel or bear on the ground and constitute the tread, for which reason it will be termed the "tread-section." The area of the tread-section is somewhat larger than the area of the rim-section, and the tread-section may be made of heavier material than the felly-section, although both of these sections may be made of the usual grade of rubber fabric or other practically non-elastic material commonly employed by the trade in the manufacture of inflatable tires. The edges of the tread and felly sections B C are arranged to abut or register, or they may overlap slightly, but overlapping is not desirable in an expansive inflatable tire. Hence I arrange the sections to have their edges abut together, as shown, when the tire is in use.

Within the tire is arranged the sealing member D, which consists of a sheet of elastic resilient rubber or equivalent material which is bent to the concavo-convex form and has its two edges $d\ d$ arranged to extend across the joint or line of severance between the adjacent edges of the tread and rim sections, and said edges $d\ d$ of the sealing member are cemented, sealed, cast, or otherwise joined to the sections B C along lines $d'\ d'$ on opposite sides of said joint or line of severance of the two sections B C, whereby the member D is joined to the sections B C in a manner to prevent the leakage of the inflatable medium, and at the same time that portion of the sealing member D between the lines $d'\ d'$ is free to expand or give in a direction radially to the wheel-axis in order that the tire may expand radially under the pressure of the inflating medium injected therein. The interior sealing member extends from side to side of the tire A, of which it forms a part, and it lies adjacent to the tread-section C.

The sealing member D and the rim-section B practically constitute an inner tube for the tire, because they form a chamber or space $c$, into which the inflating medium is forced, and said sealing member also forms a cell or space $c'$ between itself and the tread-section C, in which cell is arranged the armor that protects the tire against puncture by the penetration of sharp objects into the air space or chamber $c$. If desired, an ordinary inner tube may be placed in the chamber $c$ to make the tire possess the same qualities as the usual double-tube tires, although this is not essential to my invention. The outer sealing members E E for the joints or dividing-line between the sections B C consist of strips or layers of appropriate width, thickness, and elasticity, preferably narrow strips of elastic rubber. These outer sealing agents or members E are applied longitudinally to the outer face of the tire and over the joint between the sections B C, and said members E are cemented, sealed, cast, or otherwise united along the lines $e\ e$ to the sections B C on opposite sides of the joints between them, thus leaving the parts of the members between the lines $e\ e$ and designated by the letters $e'$ free to expand when the tire is inflated.

The armor for the tire is situated in the space or chamber $c'$ between the inner sealing member and the tread-section B, and it consists of the stout layer of leather F and the stuffed or packed tube G. The layer F is bent to concavo-convex form and is fitted directly against the inner surface of the tread-section B, so as to extend from side to side of the tire on the inside thereof, the edges of said layer F terminating or lying within the edges of the tread-section B, and said edges of the layer F being cemented or joined in a secure manner to the section B, as indicated by the letters $f$. The part G is of leather or equivalent material folded upon itself and with its edges overlapped, and it is packed or filled with any suitable fibrous material—such as cotton, hair, moss, or the like. The layer F and the packed tube are placed in the space $c'$ during the process of manufacturing the tire, and said tube may be cemented or held in place by any suitable means.

The meeting ends of the tire are joined together against separation by the employment of metallic hooks H. One hook is fastened to one end of the tire on one side thereof and the other hook is fastened to the other end of the tire on the opposite side thereof. The free ends of the hooks project from the opposite ends of the tire and they are fitted in holes or eyelets provided the proper distances back from the ends of the tube, whereby the ends of the tire are securely coupled without the employment of lacings, rivets, or sewing, and the ends cannot pull apart or become separated except by releasing the hooks. If desired, the hooks may be made with double prongs, which can be clenched upon the tire, or single-prong hooks may be used. These adjacent ends of the tire are securely closed against the escape or leakage of air by the employment of the inner coupling-tube I and an external band or tube J. The inner tube I has one end united within one end of the tire A by cementing, casting, or sealing the same therein, and the other end of the tube I, which projects beyond one end of the tire, is slipped in the opposite end of the tire and securely united thereto by cementing or sealing it in place. The outer band or tube J is slipped over and around the ends of the tire and sealed or cemented thereto, whereby the joint between the ends of the tire is rendered air-tight and proof against leakage.

Parts of my invention may be used without adopting the whole, as, for instance, the armor adopted in my expansible inflatable tire or the means for uniting the ends of the tire may be used to advantage in other styles of inflatable tires.

It is evident that changes in the form and proportion of parts and in the details of construction herein shown and described as the preferred embodiment of my invention may be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. An inflatable tire divided transversely into tread and rim sections and joined together by resilient means which afford air-proof joints and permit radial expansion of the tread-section beyond the normal inflating capacity of the tire, substantially as and for the purposes described.

2. An inflatable expansible tire consisting of sections having their edges free from restraint by each other and elastic sealing devices joined to the sections to close the joint between them and furnish the medium by which the sections may expand without exposing the joints to leakage by the inflating medium, substantially as described.

3. An inflatable expansible tire consisting of a horizontally-divided tube having the edges of the sections joined by elastic sealing members which are united to said sections on opposite sides of the lines of division thereof, as set forth.

4. An inflatable expansible tire comprising a horizontally-divided tube, an inner sealing member joined to the sections of said tube on opposite sides of the joint and arranged adjacent to the tread-section of the tube, and elastic sealing members joined to the sectional tube on the outside thereof, as set forth.

5. The combination of a sectional tube having its tread and rim members united by resilient air-proof joints, an armor-layer united to the tread-section of the tube and terminating at its edges within the elastic joints, and an inner elastic sealing member united over said joints to the section of said tube and inclosing the armor-layer between itself and the tread-section of the tire, as and for the purposes described.

6. The combination of a sectional tube having its tread and rim sections united by elastic sealing members, an inner continuous sealing member D joined to the tube-sections and forming between itself and the tread-section of the tube a space or chamber, and a punctureless armor confined within said space or chamber, as and for the purposes described.

7. The combination of a sectional tube having its tread and rim members joined by elastic sealing members which permit radial expansion of the tread-section beyond the normal inflating capacity of the tire, an inner continuous sealing member D united to the sectional tube, an armor-layer united to the tread-section and having its edges terminating within the sealing members, and a stuffed or packed tube between said armor-layer and the inner sealing member, as and for the purposes described.

8. The combination of an expansible tire provided with an inner elastic member forming a space or chamber between itself and the tread-surface of the tire, an armor-layer in said space and united to the tread-surface of the tire, and a packed or stuffed tube arranged between said elastic member and the armor-layer, as set forth.

9. The combination of a continuous tube forming an inflatable tire, metallic hooks provided with prongs which engage with the tube near the ends thereof, and sealing-bands inclosing said hooks and the ends of the tube, for the purposes described, substantially as set forth.

In testimony whereof I affix my signature in presence of two witnesses.

GEORGE WASHINGTON WHITE.

Witnesses:
 JNO. T. McCALLEY,
 E. B. STEWART.